United States Patent [19]

Clifton et al.

[11] Patent Number: 4,538,943
[45] Date of Patent: Sep. 3, 1985

[54] ADJUSTABLE NOSEPIECE FOR A DRILL MOTOR

[75] Inventors: James E. Clifton, El Cajon; Ronald F. Carlson, San Diego, both of Calif.

[73] Assignee: General Dynamics Corporation/Convair Div., San Diego, Calif.

[21] Appl. No.: 642,703

[22] Filed: Aug. 20, 1984

Related U.S. Application Data

[63] Continuation of Ser. No. 363,212, Mar. 29, 1982, abandoned.

[51] Int. Cl.³ .............................................. B23B 45/14
[52] U.S. Cl. ..................................... 408/14; 173/163; 408/72 B; 408/241 S
[58] Field of Search .................. 408/72 R, 72 B, 110, 408/111, 76, 241 S, 241 B, 84, 202, 112, 14; 173/163; 279/1 A, 1 B, 1 TS, 83

[56] References Cited

U.S. PATENT DOCUMENTS

| | | | |
|---|---|---|---|
| 2,674,098 | 4/1954 | Taylor | 408/130 X |
| 2,823,563 | 2/1958 | Nipken | 408/110 |
| 2,868,044 | 1/1959 | Chaffee et al. | 408/110 |
| 3,487,729 | 1/1970 | Juhasz et al. | 408/14 |
| 3,801,115 | 4/1974 | Benjamin | 279/1 B X |

FOREIGN PATENT DOCUMENTS

| | | | |
|---|---|---|---|
| 566231 | 12/1944 | United Kingdom | 408/202 |
| 607571 | 9/1948 | United Kingdom | 408/112 |

*Primary Examiner*—Z. R. Bilinsky
*Attorney, Agent, or Firm*—John R. Duncan; Frank D. Gilliam

[57] ABSTRACT

A nosepiece for a drill motor. The nosepiece is adjustable to allow the nosepiece length to be changed rapidly to compensate for different drill lengths. The nosepiece is threaded to mate with threads on the drill motor housing and can be adjusted longitudinally along the motor center line axis. When the nosepiece is threaded along the housing to a desired location it is locked in place by a locking ring keyed to the nosepiece and fixed in position on the drill motor housing by a hand adjustable set screw.

3 Claims, 4 Drawing Figures

ADJUSTABLE NOSEPIECE FOR A DRILL MOTOR

This application is a continuation of application Ser. No. 363,212, filed Mar. 29, 1982, now abandoned.

BACKGROUND OF THE INVENTION

This invention lies in the field of drill presses or handheld drill motors which translate as well as rotate the drill bit.

Presently available drill motors of this type include a nosepiece that is fixed in length on the drill housing and the drill chuck holding the drill bit rotates and translates a fixed distance within this housing. This type device is very effective so long as the drill bit length and chuck translation distance are sufficient to drill through the material thickness or drill exact-depth holes. As drill bits dull, they must be resharpened, which decrease their length and, after several resharpening cycles, they decrease to an unacceptable length; that is, with normal chuck translation, they are too short to drill through the material thickness or to drill an exact required hole depth. It is common practice to discard the now too short drill bit and replace it with a new drill bit and so forth. This, of course, is expensive and, therefore, it would be desirable to continue to use the same drill bit for extended periods.

SUMMARY OF THE INVENTION

The invention is directed to a drill motor nosepiece that is translatable relative to the drill motor housing rather than fixed in length as now known in the art. As the drill bit becomes shorter due to resharpening cycles, the nosepiece can be translated along the housing to effectively increase the length of the drill bit. A lock ring keyed to the nosepiece selectively locks the nosepiece to the housing at a selected location thereon.

An object of this invention is to increase the economic life of a drill bit.

Another object of this invention is to enable the operator of a drill motor to rapidly adjust the nosepiece length to accommodate various different drill bit lengths to accomplish a given task.

Still another of the invention is to enable the operator of a drill motor to precisely adjust the nosepiece length to accommodate specific known non-standard drill lengths to accomplish a given task.

Other advantages of this invention will become more apparent and better understood when the specifications are read in connection with the following drawings in which:

BRIEF DESCRIPTION OF THE INVENTION

DETAILED DESCRIPTION OF THE DRAWINGS

Figure 1:
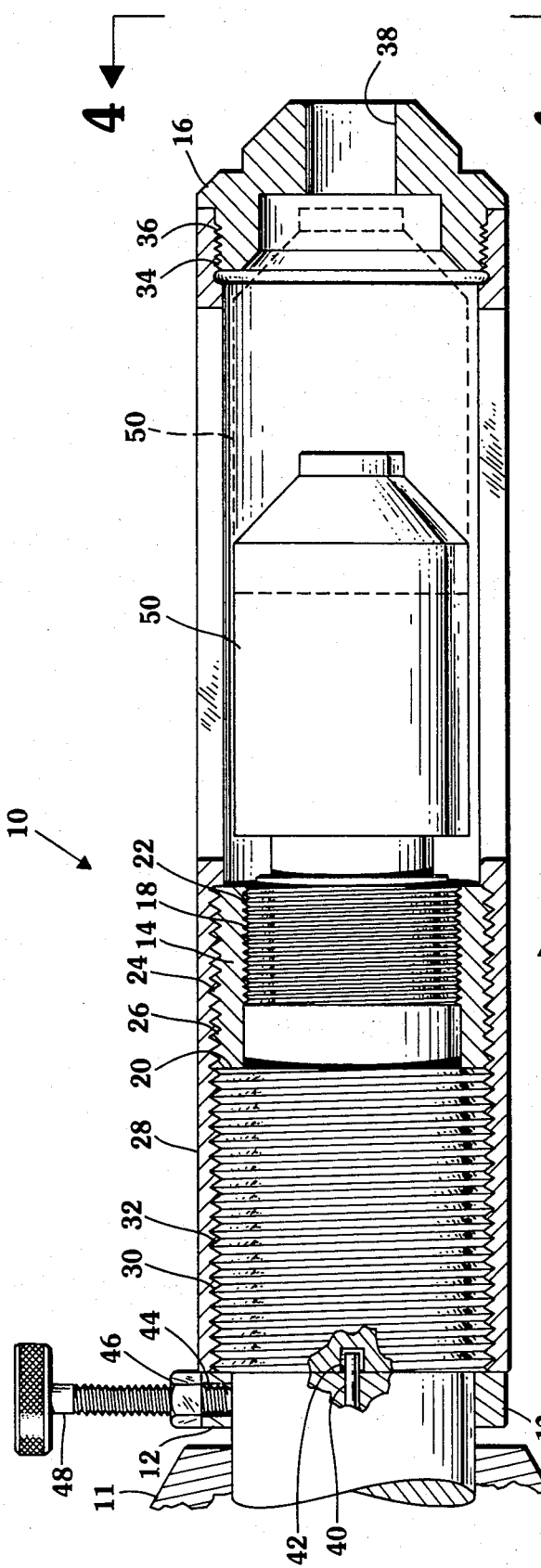
FIG. 1 is a cutaway showing of a portion of the drill motor and the nosepiece.
Figure 4:
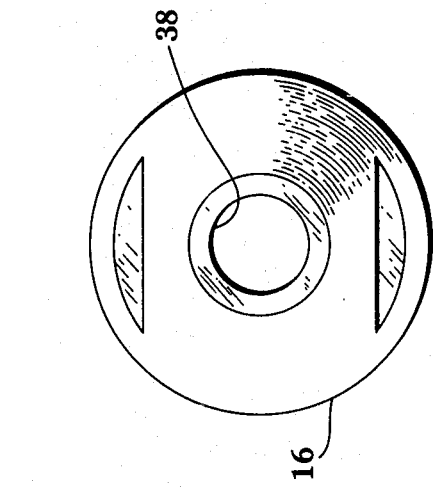
FIG. 4 is an end view of the bushing adapter taken along line 4—4 of FIG. 1.
Figure 3:
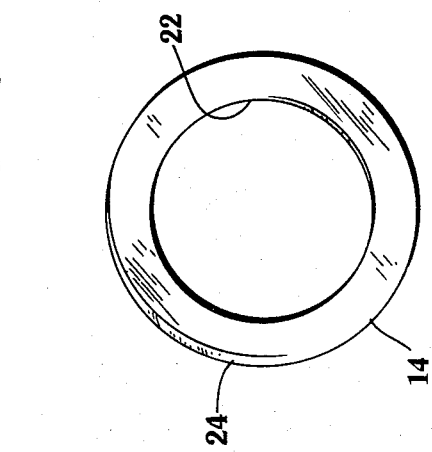
FIG. 3 is an end view of the adapter.
Figure 2:
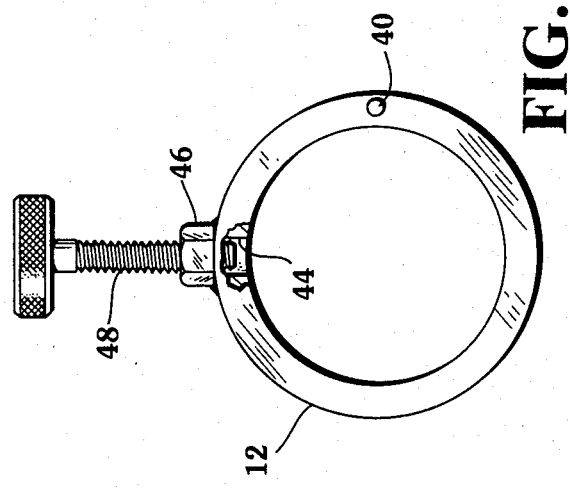
FIG. 2 is an end view of the locking collar.

Referring now to the figures, FIG. 1 is a cross-sectional showing of the nosepiece 10 including the chuck end of the drill motor 11, a locking collar 12, a drill motor adapter 14 and a bushing adapter 16. The drill motor adapter shown is constructed to adapt to the threads 18 carried by the housing 20 of a Gardner Denver Peck air feed drill motor Model MM8, typically used in the aerospace industry. The drill motor adapter 14 has threads 22 which threadly engage threads 18 carried by the housing 20 and threads 24 which engage with threads 26 of housing 28 of the nosepiece 10. Those drill motors having no threads initially will be threaded to mate with the threads of the nosepiece.

The chuck end of the drill motor 11 includes threads 18 around the distal end of the housing 20. The threads 18 mate with the inner threads 22 of drill/motor adaptor 14.

The nosepiece housing 28 includes first inner threads 32 on the chuck attachment end which mate with threads 24 on the drill/motor adaptor and second inner threads 34 which mate with threads 36 on the bushing adapter 16.

The bushing adapter 16 includes an opening 38 for receiving drill bushings of various drill bit sizes such as Keller type bushings well known in this art.

The lock collar 12 includes a key 40 which engages with a slot or hole 42 in the drill mating end of nosepiece 10. When 40,42 are mated, the collar 12 is keyed to the nosepiece. An aperture 44 passes through the collar. A nut 46 is fixedly attached to the collar 12. Its aperture is in alignment with aperature 44 so that screw 48 can be threaded through so as to pass through aperature 44 and engage housing 20, thus locking the collar and nosepiece in a selected location along the housing.

ASSEMBLY AND OPERATION

First the drill motor adapter 14 is threaded on the chuck end of the housing 20 of the drill motor. The nosepiece 10 is then threaded onto the housing and drill motor adapted and locked by lock collar 12 at a selected location on the housing, the location depending on drill length and the material thickness to be drilled or the hole depth in the material to be drilled. The desired bushing (not shown) is then inserted into the bushing adapter 16. The drill motor is now ready for use. The drill chuck 50 shown in its rest position is then translated to its phantom position as the drill bit is rotated.

The FIG. 1 showing of the location of the nosepiece relative to the drill motor housing, chuck, etc. is in its maximum short drill position. The nosepiece 10 is adjusted along arrow 52 to accommodate longer drill bits. The maximum drill length variation can vary through a wide range of lengths; however, drill length variations of around 3 inches or slightly less are very practical.

The pitch of the threads 30,32 can be selected so that a complete turn of the nosepiece with respect to the drill motor housing can be a precise length, such as for example, 0.001, 0.005, 0.01, 0.05, etc. so that when the exact length of a drill bit is known, a precise adjustment between the nosepiece and the drill motor housing can be obtained.

The nosepiece and its constituent parts may be constructed of any material suitable for the purpose intended, such as, but not limited to, steel, etc.

It will be apparent that various forms of the invention illustrated and described herein provide a very effective drilling system wherein drill bits of various different lengths can be utilized beyond their normal use.

Having thus described the invention, what is claimed as new and useful and desired to be secured by United States Letters Patent is:

1. An adapter nosepiece for a drill motor, said drill motor having an outer housing, a rotatable shaft which translates a pre-determined fixed distance relative to said outer housing, said shaft including a chuck for holding a drill bit on the distal end thereof comprising:

mating means for mating said nosepiece to said housing, said mating means provides for longitudinal positioning of said nosepiece along said housing and comprises engaging threads carried by said housing and said adapter nosepiece whereby each rotation of said adapter nosepiece relative to said housing translates said adapter nosepiece a known finite distance along said housing;

a locking means for locking said nosepiece in a selected location along said housing, said locking means comprises a collar moveably securable along said housing, said collar includes a key extending toward the distal end of said nosepiece; and a key slot positioned along the end of said nosepiece adjacent the housing engaging end for receiving said key, when said collar is secured to said housing and said key engages said slot, said nosepiece is locked in position relative to said housing.

2. The invention as defined in claim 1 wherein said collar surrounds said housing and includes a single screw, one end of which engages said housing for a friction locking engagement therewith.

3. The invention as defined in claim 2 wherein the screw comprises a thumb screw in engagement with said housing and infinitely selective both rotatably and axially thereon.

* * * * *